United States Patent Office 3,446,897
Patented May 27, 1969

3,446,897
COMPOSITIONS AND METHODS FOR THE CONTROL OF CARDIAC ARRHYTHMIA WITH O-SUBSTITUTED PYRROLIDINOLS AND S-SUBSTITUTED THIOPYRROLIDINOLS
Theodore F. Koppanyi, Washington, D.C., assignor to A. H. Robins Company, Incorporated, Richmond, Va., a corporation of Virginia
No Drawing. Continuation-in-part of application Ser. No. 472,299, July 15, 1965. This application Sept. 30, 1966, Ser. No. 583,414
Int. Cl. A61k 27/00
U.S. Cl. 424—274   9 Claims

ABSTRACT OF THE DISCLOSURE

The control of cardiac arrhythmia with O-substituted pyrrolidinols and S-substituted thiopyrrolidinols and compositions therefor.

---

The present invention relates to a method of controlling cadriac arrhythmia using certain O-substituted pyrrolidinols and S-substituted thiopyrrolidinols, and novel compositions suitable therefor. This application is a continuation-in-part of applicant's copending application Ser. No. 472,299, filed July 15, 1965, now abandoned.

The antiarrhythmic agents of this invention are illustrated generally by the following formula:

FORMULA I

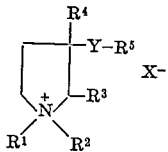

wherein:

$R^1$ is a lower-alkyl radical or hydrogen,
$R^2$ is an aralkyl, substituted aralkyl radical or thenyl,
$R^3$ is hydrogen or lower-alkyl,
$R^4$ is hydrogen or lower-alkyl,
$R^5$ is hydrogen, alkanoyl or aroyl,
Y is oxygen or sulfur, and
$X^-$ is an anion pharmaceutically acceptable Various types of drugs have been known prior to this invention to exhibit antiarrhythmic action, as reported, for example, by Dawes, Pharmacological Reviews, volume 4, pages 43–85 (1952). Such previous attempts at systemic control of ectopic tachycardia have, in general, not been completely satisfactory due to the cardiac depression induced thereby as well as such other side effects as ventricular extrasystoles, ventricular tachycardia, severe lowering of blood pressure, etc. Cardiac standstill during depression is one of the most serious effects produced by previously known cardiac antiarrhythmic agents.

The present invention involves the discovery that certain novel compounds are useful as antiarrhythmic agents, yet which will not produce significant cardiac related side effects such as mentioned above even when administered in relatively high dosages. 1-benzyl-3-substituted pyrrolidinols, especially 1-benzyl-3-pyrrolidinol acetate methobromide, have been found to be particularly effective as antiarrhythmics in accordance with this invention.

It is therefore a primary object of the present invention to provide a novel method for controlling arrhythmia, and especially inhibiting or preventing ectopic tachycardia and other arrhythmia as premature beats by the use of the compounds of this invention. Another object is to provide a method for controlling arrhythmia without concurrently inducing intolerable side effects, and to further provide novel compositions suitable for use in carrying out this method. Another, more specific object is to provide a method of controlling arrhythmia, and compositions therefor, by administering an effective amount of an N-substituted-3-substituted, or 3-di-substituted, pyrrolidinol or thiopyrrolidinol, and especially the 1-benzyl compounds such as 1-benzyl-3-pyrrolidinol acetate methobromide.

Additional objects and advantages of the present invention will be apparent to one skilled in the art, and still others will become apparent from the following description of the best mode of carrying out the present invention and examples thereof, and from the appended claims.

In the definitions of the symbols in Formula I given above, and where they appear elsewhere throughout the claims and specification hereof, the terms used herein shall have the following significance: "Substituted phenyl" shall mean a phenyl radical substituted by an radical or radicals which are not reactive or otherwise interfering under the conditions of reaction described herein, such as lower-alkoxy, lower-alkyl, trifluoromethyl, halo, and the like. The substituted phenyl radicals have preferably no more than three substituents such as those given above and, furthermore, these substituents can be in various available positions of the phenyl nucleus and, when more than one substituent is present, may be the same or different and may be in various position combinations relative to each other. The lower-alkyl and lower-alkoxy substituents each have preferably from one to four carbon atoms which can be arranged as straight or branched chains. Examples of the preferred substituents are methyl, ethyl, propyl, butyl, bromo, chloro, iodo, methoxy, ethoxy, propoxy, butoxy, and trifluoromethyl.

Lower-alkyl includes straight and branched chain radicals containing 1–6 carbon atoms, for example, methyl, ethyl, propyl, isopropyl, n-butyl, isobutyl, tertiary butyl, amyl, isoamyl, n-hexyl.

$R^2$ is an aralkyl, or substituted aralkyl radical, or thenyl. Benzyl is the preferred radical in view of the more pronounced activity shown by the N-benzyl substituted compounds; however, other suitable radicals are, for example, phenethyl, o- or p-bromobenzyl, o- or p-chlorobenzyl, o- or p-methylbenzyl, o- or p-ethylbenzyl, and the like.

Representative pharmaceutically acceptable anions which are identified by "X—" include such usual non-toxic and pharmaceutically acceptable anions as halogen, especially chlorine, bromine and iodine, sulfate, sulfonate, benzoate, acetate, tartrate, citrate, phosphate, glycolate, succinate, maleate, ascorbate, cinnamate, mandelate, benzilate, diphenylacetate, or the like, the anion being of either organic or non-organic nature.

The compounds employed as active antiarrhythmic agents are thus salts of O-substituted 3-pyrrolidinols and S-substituted 3-thiopyrrolidinols according to Formula I, preferably quaternary ammonium salts which apparently have more pronounced activity. The quaternary ammonium salts are readily formed by treatment of the corresponding free base with the appropriate salt-forming substance, including, for example, methyl chloride, methyl bromide, methyl iodide, methyl sulfate, ethyl chloride, ethyl bromide, ethyl iodide, n-propyl chloride, n-propyl bromide, n-propyl iodide, isopropyl iodide, n-butyl chloride, n-butyl bromide, isobutyl bromide, sec-butyl bromide, n-amyl chloride, isoamyl chloride, n-amyl bromide, isoamyl bromide, n-amyl iodide, isoamyl iodide, n-hexyl chloride, isohexyl chloride, n-hexyl bromide, isohexyl bromide, n-hexyl iodide, isohexyl iodide, or similar quaternary salt-forming substances, according to general procedures which are well known in the art.

At least two asymmetric centers are present in all of the compounds which may be used in the present invention at the 1- and 3-position of the pyrrolidinol ring. At least one pair of diastereoisomers therefore exists for each compound. Use of these diastereoisomers, or their optically active forms, is included within the scope of the present invention. The optically active forms of the diastereoisomers may be obtained by combining the basic racemic form with an optically active organic acid and separating by fractional crystallization the d- and l-forms. The free bases of the d- and l-forms are then converted to their quaternary ammonium salts by treatment with the appropriate quaternary salt-forming substance as described hereinbefore. The separated d- and l-forms may also be used according to the invention.

Compounds possessing the gross structures of 3-acyloxy-1-benzylpyrrolidine methobromides possess two asymmetric centers and are therefore capable of existing as diastereoisomers.

Quaternization of a 1-methyl-3-pyrrolidinol with benzyl bromide introduces a second asymmetric center thereby giving rise to the formation of two d,l racemates. Similarly, the quaternization of a 1-benzyl-3-pyrrolidinol with methyl bromide introduces a second asymmetric center thereby giving rise to the formation of two d,l racemates. It has been shown by nuclear magnetic resonance that in each quaternization reaction both pairs of d,l racemates are formed in a ratio of 2:1, one pair being formed in the major portion by one procedure, the other pair being formed in the major amount by the other procedure. In isolating the reaction product, the diastereoisomer formed as the major component is isolated.

Acylation of the hydroxy group prior to quaternization or after quaternization has no effect on the diastereoisomer isolated.

In general, the compounds hereof are prepared by an acylation process starting with a N-substituted-3-pyrrolidinol or N-substituted-3-thiopyrrolidinol. In the case of quaternary salts, quaternization of the starting material may be carried out first as mentioned above.

Acid additions salts may be prepared by well-known methods, by reacting the free base with an organic or inorganic acid in aqueous solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Examples of such organic salts are those with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

The starting n-substituted-3-pyrrolidinols used to make the compounds of this invention have been previously described in United States Patents 2,830,997 and 2,838,521 to Carl D. Lunsford, which disclosures are hereby incorporated by reference.

The compounds of this invention are prepared according to the following general formula diagrams:

PREPARATION A

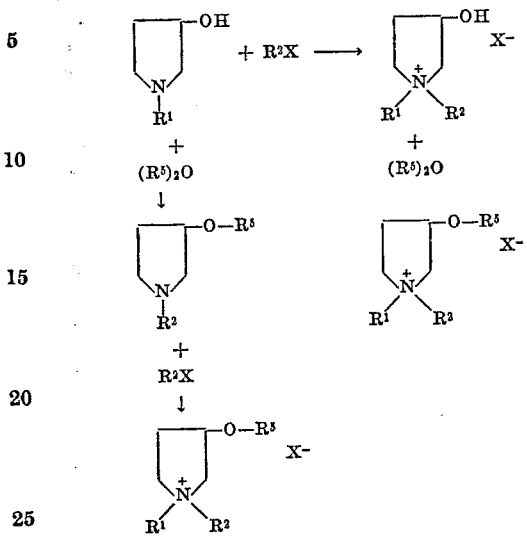

In each step the time and temperature may be varied over wide ranges, and are not critical to the reactions which may, but need not be, carried out at room or elevated temperatures. For example, acylation of a N-substituted-3-pyrrolidinol may be conveniently carried out from about room temperature up to the boiling point of the acylating agent, the rate of reaction increasing with increased reaction temperature. In the case of salt formation, the reaction proceeds almost immediately and completely, although in the case of some quaternaries, it is helpful to provide heat to accelerate the reaction to completion within a short period of time.

PREPARATION B

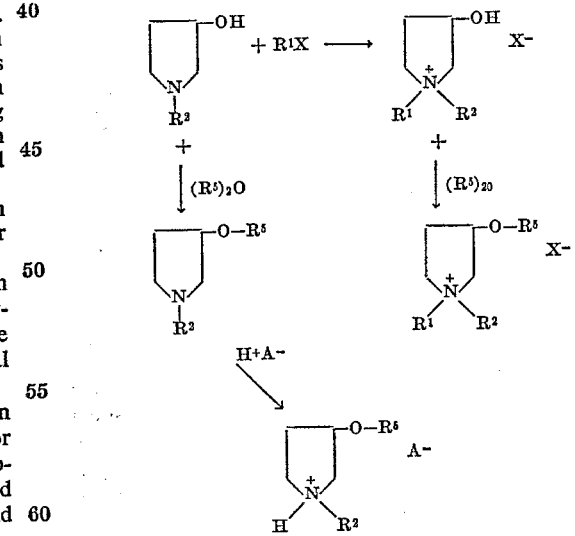

In the above, HA represents an acid comprised of H+ and anion "A" corresponding to any suitable anion of the type described above in connection with the production of acid addition salts from the free base compounds of this invention.

PREPARATION C

The thiopyrrolidinols of this invention may be prepared by reacting a thioester with an alcohol in the presence of a catalyst such as sodium. This general procedure is set out in an article by Beil et al., Journal of American Chemical Society, vol. 77, page 2250, (1955). The thioesters are obtained by procedures described in "Physiologically Active Compounds," VI, "Cyclic Amino Thioesters of Substituted Chloroacetic, Benzilic and Glycolic Acids," Calvin A. Buehler, et al., Journal Medicinal Chemistry, vol. 8, pages 643–647, (1955). In general, the preparation is as follows:

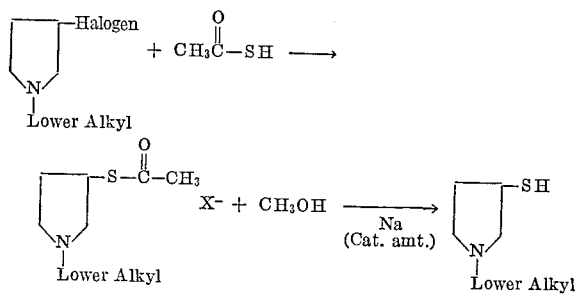

In some cases, the compounds hereof have an additional substituent on the 3 position of the pyrrolidinol ring, $R^4$.

These compounds are, in general, prepared as follows:

PREPARATION D

Compounds having an alkyl substituent in the three position as, for example, 1,3-dimethyl-3-pyrrolidinol are prepared from appropriately alkylated malic acids which are prepared by procedures well known in the art. The alkylated malic acids are converted to the maleimides by reaction with a primary amine and the maleimide reduced by lithium aluminium hydride. The preparation is as follows ($R^1$ may be replaced by $R^2$ in the amine when desired):

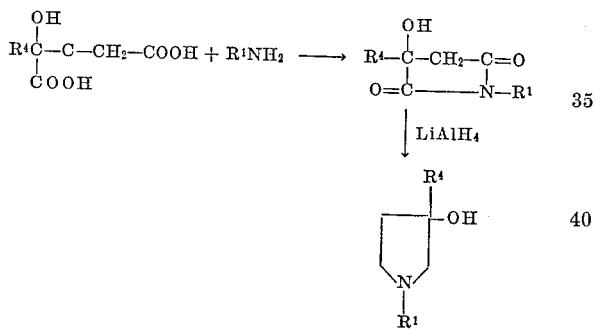

All compounds within the scope of Formula I and the general preparation given above may be prepared in accordance with the principles illustrated by the following preparation examples and particularly, within the reaction time, temperatures, and other conditions cited.

Example 1.—1-benzyl-3-pyrrolidinol acetate methobromide

Benzyl bromide (51.5 g., 0.30 mole) and 30 g. (0.30 mole) of 1-methyl-3-pyrrolidinol was mixed with 500 ml. of 2-butanone thereby precipitating an oil. The oil, after decanting the 2-butanone was dissolved in a refluxing mixture of 500 ml. of dioxane and 300 ml. of acetic anhydride. The solid which separated on cooling was recrystallized from 2-butanone containing a small amount of methanol. The yield of colorless crystals was 32 gms. (34%); M.P. 185–187° C.

*Analysis.*—Calculated for $C_{14}H_{20}BrNO_2$: C, 53.51%; H, 6.42%; N, 4.46%; Br⁻, 25.43%. Found: C, 53.78%; H, 6.42%; N, 4.74%; Br⁻, 25.47%.

Example 2.—(—) 1-benzyl-3-pyrrolidinol acetate methobromide (—) 1-methyl-3-pyrrolidinol (5.0 g.; 0.0495 mole), 5.4 g. (0.053 mole) of acetic anhydride and 1 gm. of 2° pyridine was combined with 100 ml. of chloroform and the solution refluxed for one hour. The chloroform solution, after washing with sodium carbonate solution and water, was briefly dried over sodium sulfate and concentrated to a yellow oil which was distilled to give 4.4 gms. (62.0%) of (—) 1-methyl-3-pyrrolidinol acetate, B.P. 95–7° C./40 mm. The 4.4 g. (0.03 mole) of (—) 1-methyl-3-pyrrolidinol acetate in 2-butanone was treated with 6.8 g. (0.04 mole) of benzyl bromide. The separated solid was collected and recrystallized several times from 2-butanonemethanol to give 2.0 g. (21.0%) of white crystals, M.P. 158–160° C.

*Analysis.*—Calculated for $C_{14}H_{10}BrNO_2$: Br⁻, 25.43%. Found: Br⁻, 25.36%.

Example 3.—1-benzyl-3-pyrrolidinol isobutyrate methobromide

To a solution of 20.6 g. (0.12 mole) of 1-methyl-3-pyrrolidinol isobutyrate in 50 ml. of ethyl ether was added dropwise with cooling and agitation 20.6 g. (0.12 mole) of benzylbromide. The oil which separated was crystallized by tituration with fresh quantities of methyl isobutyl ketone. The crude salt was recrystallized from 2-butanone containing a small amount of methanol to give 16.4 g. (40%) of white crystals melting at 138–140° C.

*Analysis.*—Calculated for $C_{16}H_{24}BrNO_2$: Br⁻, 23.36%. Found: Br⁻, 23.50%.

Example 4.—1-phenethyl-3-pyrrolidinol acetate methobromide

Eighteen and one-half grams (0.10 mole) of 2-bromoethyl benzene was added dropwise to a stirred solution of 14.3 g. (0.10 mole) of 1-methyl-3-pyrrolidinol acetate in 50 ml. of ethyl ether. The hygroscopic solid which separated was crystallized from 2-butanone containing a small amount of methanol; the crystallized material melted at 113–115° C.

*Analysis.*—Calculated for $C_{15}H_{22}BrNO_2$: Br⁻, 24.34%. Found: Br⁻, 24.97%.

Example 5.—1-benzyl-3-pyrrolidinol benzoate methobromide 1-methyl-3-pyrrolidinol benzoate (20.5 g. 0.10 mole) in 75 ml. of ethyl ether was treated with 17.1 g. (0.10 mole) of benzyl bromide. The salt which was observed to be very hygroscopic was triturated several times with anhydrous ethyl ether, collected and dried in vacuo. The yield of material melting at 55–63° C. was 28.0 g. (80.0%).

*Analysis.*—Calculated for $C_{19}H_{22}BrNO_2$: Br⁻, 21.24%. Found: Br⁻, 21.15%.

Example 6.—1-(o-bromobenzyl)-3-pyrrolidinol methobromide 1-methyl-3-pyrrolidinol (4.57 g. 0.032 mole) in dry ethyl ether was treated with 8 g. (0.032 mole) of o-bromobenzyl bromide. The ether insoluble oil crystallized on trituration with fresh quantities of ether. The hygroscopic salt was dried in vacuo and stored under nitrogen in a brown bottle.

*Analysis.*—Calculated for $C_{12}H_{17}BrNO_2$: Br⁻, 22.76%. Found: Br⁻, 22.90%.

Example 7.—1-(α-methylbenzyl)-3-pyrrolidinol acetate methobromide

To a solution of 1-methyl-3-pyrrolidinol acetate (10 g. 0.07 mole) in 50 ml. of dry ethyl ether was slowly added 13 g. (0.07 mole) of 1-bromoethyl benzene. The oil which separated was crystallized on repeated trituration with fresh ether. The hygroscopic salt was dried under vacuum.

*Analysis.*—Calculated for $C_{15}H_{22}BrNO_2$: Br⁻, 24.35%. Found: Br⁻, 23.66%.

Example 8.—1-(o-bromobenzyl)-3-pyrrolidinol benzoate methobromide

The addition of 2.5 g. (0.01 mole) of o-bromobenzyl bromide to 2.05 g. (0.01 mole) of 1-methyl-3-pyrrolidinol acetate in dry ether gave a very hygroscopic white crystalline salt which was dried in vacuo and stored under nitrogen.

*Analysis.*—Calculated for $C_{19}H_{21}Br_2NO_2$: Br⁻, 17.56%. Found: Br⁻, 18.25%.

Example 9.—1-(o-bromobenzyl)-3-pyrrolidinol methobromide o-Bromobenzyl bromide (4.95 g.; 0.0198 mole) was added slowly to a solution of 2.0 g. (0.0198 mole) of 1-methyl-3-pyrrolidinol in dry ethyl ether. After thorough mixing an oil separated. The ether was repaced by 2-butanone and with trituration the oil crystallized. After three crystallizations from 2-butanone, 1.0 g. (14.5%) of white crystalline material melting at 154.5–156° C. was obtained.

*Analysis.*—Calculated for $C_{12}H_{17}Br_2NO$: $Br^-$, 22.76%. Found: $Br^-$, 22.90%.

Example 10.—1-benzyl-3-pyrrolidinol methobromide

To 30 g. (0.17 mole) of 1-benzyl-3-pyrrolidinol in 200 ml. of 2-butanone was added a solution of 20 g. (0.19 mole) of methyl bromide in 300 ml. of 2-butanone. The oil which separated was solubilized by heating the mixture and adding ethyl alcohol. From the cooled mixture 19 g. (41%) of crystalline material melting at 142–144° C. was isolated. Three recrystallizations from a 2-butanone ethyl alcohol combination gave 15 g. (32%) of white crystalline material melting at 154° C.

*Analysis.*—Calculated for $C_{12}H_{18}BrNO$: $Br^-$, 29.36%. Found: $Br^-$, 29.14%.

Example 11.—(+) 1-benzyl-3-pyrrolidinol acetate methobromide (+) 1-methyl-3-pyrrolidinol (5.0 g.; 0.05 mole), 5.4 g. (0.053 mole) of acetic anhydride and 1.0 g. of 2° pyridine was combined with 100 ml. of chloroform and the solution refluxed for one hour. The reaction mixture was washed with sodium carbonate solution, water, dried briefly over sodium sulfate and concentrated to an oil. Distillation of the oil gave 4 g. (57%) of (+) 1-methyl-3-pyrrolidinol acetate; B.P. 95° C./40 mm. The 4 g. (0.028 mole) of (+) 1-methyl-3-pyrrolidinol acetate was dissolved in 2-butanone and the solution treated with 5.1 g. (0.03 mole) of benzyl bromide. The crystalline solid which separated was recrystallized twice from 2-butanone-methanol to give 1.5 g. (17.1%) of white crystalline material melting at 157–159° C.

*Analysis.*—Calculated for $C_{14}H_{20}BrNO_2$: $Br^-$, 25.43%. Found: $Br^-$, 25.27%.

Example 12.—1-benzyl-3-pyrrolidinol propionate methobromide 1-methyl-3-pyrrolidinol propionate (17.3 g. 0.109 mole) was dissolved in 50 ml. of 2-butanone and 18.6 g. (0.109 mole) of benzyl bromide added with swirling. Ether was added to the reaction mixture precipitating an oil which crystallized on trituration with acetone to give 19.4 g. (54%) of solid material melting at 141–146° C. Two recrystallizations of the crude material from 2-butanone containing a small amount of methanol gave 16.3 g. (45.5%) of white crystalline 1-benzyl-3-pyrrolidinol propionate methobromide melting at 151.5–153.5° C.

*Analysis.*—Calculated for $C_{15}H_{22}BrNO_2$: $Br^-$, 24.36%. Found: $Br^-$, 24.7%.

Example 13.—1-benzyl-2-methyl-3-pyrrolidinol acetate methobromide

To a solution of 6.2 g. (0.04 mole) of 1,2-dimethyl-3-pyrrolidyl acetate in 30 ml. of acetone was added slowly and with stirring 6.84 g. (0.04 mole) of benzyl bromide. The crystalline salt which separated was collected, dried and recrystallized from 2-butanone containing a little methanol. The dried white crystalline salt weighed 6.4 g. (48.7%) and melted at 192–194° C.

*Analysis.*—Calculated for $C_{15}H_{22}BrNO_2$: $Br^-$, 24.35%. Found: $Br^-$, 24.60%.

Example 14.—1-benzyl-2-methyl-3-pyrrolidinol propionate methobromide 1,2-dimethyl-3-pyrrolidyl propionate (5.4 g.; 0.032 mole) in 50 ml. of anhydrous ether was treated with 5.5 g. (0.032 mole) of benzyl bromide. The white hygroscopic solid which separated was dried in a drying pistol and recrystallized from 2-butanone to give 2.2 g. (20.0%) of material melting at 195–197° C.

*Analysis.*—Calculated for $C_{16}H_{24}BrNO_2$: $Br^-$, 23.35%. Found: $Br^-$, 23.92%.

Example 15.—1-benzyl-2-methyl-3-pyrrolidinol isobutyrate methobromide 1,2-dimethyl-3-pyrrolidyl isobutyrate (7.1 g.; 0.038 mole) in 40 ml. of dry ether was treated with 6.5 g. (0.038 mole) of benzyl bromide; a white solid separated. The ether was decanted and the solid collected after trituration with acetone. Recrystallization of the solid from 2-butanone and methanol gave 1.5 g. (10.8%) of white crystalline solid melting at 183.5–184° C.

*Analysis.*—Calculated for $C_{17}H_{26}BrNO_2$: $Br^-$, 22.43%. Found: $Br^-$, 22.75%.

Example 16.—3-acetoxy-1-benzylpyrrolidine methobromide

A solution of 19 g. (0.07 mole) of 1-benzyl-3-hydroxypyrrolidine methobromide and 40 g. (0.4 mole) of acetic anhydride in 150 ml. of acetonitrile was refluxed 60 hours and concentrated in vacuo. The residue was triturated under ether and the ether decanted. The residue was crystallized twice from methyl isobutyl ketone-acetonitrile. Yield 10 grams, M.P. 131–136° C. Recrystallized twice from methyl isobutyl ketone-acetonitrile and twice from methyl isobutyl ketone-ethanol. Yield, 3.2 g. (14.5%) M.P. 133–139° C.

*Analysis.*—Calculated for $C_{14}H_{20}BrNO_2$: C, 53.51; H, 6.42; N, 4.46. Found: C, 54.13; H, 6.49; N, 4.26.

Example 17.—3-acetoxy-1-(o-bromobenzyl)-pyrrolidine methobromide

A solution of 4.57 g. (0.032 mole) of N-methyl-3-pyrrolidyl acetate in 50 ml. anhydrous ether was treated while stirring with 8 g. (0.032 mole) of o-bromobenzyl bromide; an oil separated. The oil was triturated 4 times in anhydrous ether giving a very hygroscopic white solid. The ether was decanted and the solid dried overnight under vacuum in drying pistol and stored in a bottle under nitrogen. No melting point obtained due to hygroscopic property. Yield, 22%.

*Analysis.*—Calculated for $C_{14}H_{19}Br_2NO_2$: Br, 20.34. Found: Br, 20.41.

Example 18.—3-acetoxy-1-phenylpyrrolidine methobromide

A methyl ethyl ketone solution of 1-phenyl-3-pyrrolidyl acetate was treated with a five fold excess of methyl bromide, stoppered, and allowed to stand at room temperature for one week. The solid material thus produced was recrystallized from 2-butanone-methanol, 2-butanone-ethanol, and isopropanol-isopropyl ether to yield a crystalline solid, melting 157.5–160° C., which was shown by analysis and by weight loss on vacuum drying to be a hemihydrate. M.W. 309.21.

*Analysis.*—Calculated for $C_{13}H_{18}BrNO_2$: C, 50.49; H, 6.19; N, 4.53. Found: C, 50.56; H, 6.27; N, 4.42.

Example 19.—1-phenyl-3-pyrrolidinol methobromide

A solution of 1-phenyl-3-pyrrolidinol in dry methyl ethyl ketone was treated with a large excess of methyl bromide in methyl ethyl ketone. The resultant solution was stoppered and allowed to remain seven days at room temperature. The crystalline solid which had precipitated was removed and recrystallized a number of times from methyl ethyl ketone-methanol to give a solid melting at 146.5–147.5° C. This solid was recrystallized several times from ethanol-ethyl ether and dried at 40° C./30 mm. for 2 hours to obtain a solid melting 151–153° C.

*Analysis.*—Calculated for $C_{11}H_{16}BrNO$: C, 51.17; H, 6.25; N, 5.43. Found: C, 50.85; H, 6.16; N, 5.43.

Example 20.—3-thioacetoxy-1-benzylpyrrolidine methobromide

-1-methyl-3-chloropyrrolidine (52.4 g.=0.438 mole) and thiolacetic acid (25 g.=0.328 mole) were refluxed in 150 ml. anhydrous isopropanol for 8 hours. A second portion (25 g.) of thiolacetic acid was added and reflux continued for an additional 8 hours. Then preparation was allowed to stand at room temperature for about 72 hours. The alcohol was evaporated under vacuum and the residue made alkaline keeping temperature below 10° C. Ether extraction and distillation of the extract residues yielded 14.5 g. of an oil which distilled at 107–114° C./25 mm. The distillate in methyl ethyl ketone was treated with an excess of benzyl bromide and allowed to stand 24 hours. The resultant crystalline solid when recrystallized showed a variable melting point centering around 150–160° C. A nuclear magnetic resonance spectrum indicated the solid was a mixture of isomers.

*Analysis.*—Calculated for $C_{14}H_{20}BrNOS$: Br, 24.20. Found: Br, 23.995.

Example 21.—1-benzyl-3-pyrrolidinol methobromide

To 30 g. (0.17 mole) of 1-benzyl-3-pyrrolidinol in about 300 ml. of dry methylethyl ketone was added in one portion 20 g. (0.19 mole) of methyl bromide in about 200 ml. of dry methylethyl ketone. The solution was heated on the hot plate for about 5 minutes with stirring. An oil separated which was redissolved by boiling and addition of a little absolute ethanol. On standing overnight, 19 g. (41%) of white crystals precipitated. M.P. 142–144°. Recrystallized twice from dry methylethyl ketone-absolute ethanol (small amount) mixture. Yield, 15 g. (32%), M.P. 154°.

*Analysis.*—Calculated for $C_{12}H_{18}NOBr$: Br, 29.36. Found: Br, 29.14.

Example 22.—3-acetoxy-3-methyl-1-benzylpyrrolidine methobromide

Benzyl bromide (12 g., 0.07 mole) was added to 10 g. (0.064 mole) of 1,3-dimethyl-3-pyrrolidinol acetate in 200 ml. of methyl isobutyl ketone. The resulting solid was recrystallized twice from methyl isobutyl ketone-isopropanol. Yield 4.5 g. (21.4%). (The melting point was taken by placing the material in a bath already heated.) M.P. about 197° C. (decomposes).

*Analysis.*—Calculated for $C_{15}H_{22}BrNO_2$: C, 54.88; H, 6.77; N, 4.27. Found: C, 54.95; H, 6.94; N, 4.17.

Example 23.—1-benzyl-3-methyl-3-pyrrolidinol methoiodide

A solution of 4.3 g. (0.02 mole) of benzyl iodide in 300 ml. of methyl ethyl ketone was added to 2.3 g. (0.02 mole) of 1,3-dimethyl-3-pyrrolidinol in 30 ml. of methyl ethyl ketone. The solution was warmed and an oil separated which on cooling dissolved. Warming again caused separation of the oil but a few crystals were formed. The warming was continued for 15 minutes at a temperature which caused a small amount of oil separation. The mixture was allowed to crystallize at room temperature. The resulting crystals were recrystallized from methyl ethyl ketone-isopropanol. Yield 3.6 g. (54%). M.P. 174–176° C.

*Analysis.*—Calculated for $C_{13}H_{20}INO$: C, 46.85; H, 6.05; N,4.20. Found: C, 46.76; H, 6.02; N, 4.25.

Example 24.—3-acetoxy-1,3-dimethylpyrrolidine methoiodide

Methyl iodide (10 g., 0.07 mole) was added to 10 g. (0.064 mole) of 1,3-dimethyl-3-pyrrolidinol acetate in 150 ml. of methyl isobutyl ketone. The resulting crystals were recrystallized from methyl isobutyl ketone-isopropanol. Yield 8 g. (42%). M.P. 159.5–161° C.

*Analysis.*—Calculated for $C_9H_{18}INO_2$: C, 36.13; H, 6.06; N, 4.68. Found: C, 36.00; H, 6.05; N, 4.58.

Example 25.—1,3-dimethyl-3-pyrrolidinol methoiodide

Methyl iodide (10 g., 0.07 mole) was added to 7.5 g. (0.064 mole) of 1,3-dimethyl-3-pyrrolidinol in 150 ml. of methyl isobutyl ketone. The resulting solid was recrystallized once from isopropanol and twice from methyl isobutyl ketone-isopropanol. Yield 7.5 g. M.P. 110–113° C.

*Analysis.*—Calculated for $C_7H_{16}INO$: C, 32.70; H, 6.27; N, 5.45. Found: C, 33.31; H, 6.25; N, 5.38.

PHARMACOLOGY

The cardiac arrhythmias were established using the injury stimulation method of Rosenblueth and Garcia Ramous, Am. Heart J. 33, 677 (1947) and the aconitine method of Cherf, Proc. Soc. Exp. Biol. Med., 64, 233 (1947).

Example 1

A male mongrel dog (12.5 kg.) was anesthetized with intravenous phenobarbital sodium, 125 mg./kg. The Grass polygraph and accessory equipment were used for recording carotid arterial blood pressure, jugular venous blood pressure, the electrocardiogram, respiration, intestinal motility, activity of the urinary bladder and urine flow. The thorax was opened between the third and fourth ribs on the right side and the animal was artifically respired with a Palmer pump. The pericardium was opened and arranged to form a cradle in which the heart rested. A cardiac arrhythmia was established by injecting aconitine into the wall of the right atrium. After an arrhythmia (a 2:1 rhythm with a ventricular rate of at least 200 beats/minute) had been established and persisted for 20 minutes, 1-benzyl-3-pyrrolidinol acetate methobromide was administered intravenously at 1 mg./kg./min. The concentration of the solution of the 1-benzyl-3-pyrrolidinol acetate methobromide was adjusted to the weight of the animal so that the solution when injected at the rate of 1 ml./min. contained 1 mg./kg. of the test compound. The desired end point was reversion to normal sinus rhythm with slowing of the overall heart rate. A dose of 2 mg./kg. was effective in restoring normal rhythm.

Example 2

A male mongrel dog (11.0 kg.) was prepared as in Example 1. A cardiac arrhythmia was established by crushing an area in the region on the sinoatrial node and stimulating the area electrically. After an arrhythmia (a 2:1 rhythm with a ventricular rate of at least 200 beats/minute) had been established and persisted for 20 minutes, 1-benzyl-3-pyrrolidinol acetate methobromide was administered intravenously at 1 mg./kg./min. The concentration of the solution of the 1-benzyl-3-pyrrolidinol acetate methobromide was adjusted to the weight of the animal so that the solution when injected at the rate of 1 ml./min. contained 1 mg./kg. of the test compound. A dose of 4 mg./kg. was effective in restoring normal sinus rhythm and a concomitant slowing of the overall heart rate.

Example 3

A male albino rabbit (1.9 kg. weight) was killed quickly and the heart removed immediately. The heart was washed with 50 ml. of Locke solution via the aoretic pump, the atria quickly excised and suspended in Locke solution gasses with 100% $O_2$ in a 40 ml. organ bath at 30± 1° C. The preparation was allowed to equilibrate for one hour with frequent changes of the bath fluid. A Starling heart lever, loaded to exert a tension of one gram, was used to record on a smoked drum the amplitude of the contractions of the spontaneously beating organ. A Thorp impulse counter, set at ten second intervals was used to record the rate. The amplitude of the contractions in millimeters and the rate in beats per minutes were measured just before the addition of the drugs (control) and during the maximum of the response (experimental).

Nicotine salicylate (5 micrograms/ml. of bath fluid) was used to produce tachycardia. 1-benzyl-3-pyrrolidinol acetate methobromide was added in doses of 10 micrograms/ml., 20 micrograms/ ml., 50 micrograms/ml. and 100 micrograms/ml. and the percent block of chemically induced atrial tachycardia determined. It was found that the action of nicotine salicylate was completely blocked by a dose level of 50 micrograms/ml. of 1-benzyl-3-pyrrolidinol acetate methobromide and blocked to a significant degree by lower doses. At doses up to 100 micrograms/ml. of 1-benzyl-3-pyrrolidinol acetate methobromide there are no toxic manifestations on the atria in marked contrast to agents like the procaine type, for example, which have marked depressant effect on the resting atria.

EXAMPLE 4

The atria of a male albino rabbit was prepared as in Example 3 and suspended in a 40 ml. organ bath at 30±1° C. Atropine (3 micrograms/ml.) was added to the bath and after three minutes nicotine salicylate (10 micrograms/ml.) was added. When tachycardia was demonstrated, 1-benzyl-3-pyrrolidinol acetate methobromide (100 micrograms/ml.) was added to the organ bath. The chemically induced tachycardia was reversed and there was no observed toxic effect on the atria.

EXAMPLE 5

The atria of a male albino rabbit was prepared as in Example 3 and suspended in a 40 ml. organ bath at 30±1° C. 1,1 - dimethyl - 4 - phenylpiperazinium iodide (10 micrograms/ml.) was added to the organ bath. The chemically induced tachycardia was completely blocked by adding 1-benzyl-3-pyrrolidinol acetate methobromide at a dose level of 50 micrograms/ml.

EXAMPLE 6

The atria of a male albino rabbit was prepared as in Example 3 and suspended in a 40 ml. organ bath at 30±1° C. Atropine (3 micrograms/ml.) was added to the bath and after three minutes 1,1 - dimethyl-4-phenyl-piperazinium iodide (10 micrograms/ml.) was added. The chemically induced tachycardia was reversed by the addition of 100 micrograms/ml. of 1-benzyl-3-pyrrolidinol acetate methobromide.

EXAMPLE 7

The atria of a male albino rabbit was prepared as in Example 3 and suspended in a 40 ml. organ bath at 30±1° C. Atropine (3 micrograms/ml.) was added to the bath and after three minutes acetylcholine (100 micrograms/ml.) was added. The chemically induced tachycardia was completely blocked by adding 1-benzyl-3-pyrrolidinol acetate methobromide at a dose level of 50 micrograms/ml.

EXAMPLE 8

A male albino rabbit (1.7 kg. weight) was killed quickly and the heart removed immediately. The heart was washed with 50 ml. of Locke solution via the aortic pump. The isolated rabbit heart was attached to an Anderson-Carver isolated heart apparatus and cardiac standstill was produced by infusion of 20 micrograms of carbachol in 0.1 ml. of distilled water. Infusion of a solution of 2 mg. of 1-benzyl-3-pyrrolidinol acetate methobromide in 0.1 distilled water stimulated the intact heart to beat normally, thus overcoming the depressant property of the cholinomimetic agent.

EXAMPLE 9

A male albino rabbit heart was prepared as in Example 8 and electric shock applied until cardiac standstill occurred. A solution of 2 mg. of 1-benzyl-3-pyrrolidinol acetate methobromide was injected interacardially and the heart beat resumed.

As shown in the preceding examples, it is possible in accordance with this invention, to stimulate the heart to resume beating normally, and such action is intended to be included in the term "antiarrhythmic" effect as used herein in the broader sense of tending to restore normal rate as well as rhythm of the auricles and ventricles. Such stimulation has been found to overcome cardiac standstill induced by shock (electrical shock, for example), or by chemical poisoning resulting from a cholinesterase inhibitor, for example.

The activity of the pharmacologically active agents of the present invention, as evidenced by tests in mammals is indicative of their usefulness for veterinary purposes, and of similar utility in human beings as well. While the compounds of this invention have been tolerated to a very high degree, and are therefore considered to have a wide margin of safety, it will be clearly understood that the distribution and marketing of any compound or composition falling within the scope of the present invention for use in human beings will, of course, be subject to prior approval by the United States Food and Drug Administration.

The invention further provides pharmaceutical compositions comprising, as active ingredient, at least one of the compounds according to the invention in association with a pharmaceutical carrier or excipient. The compounds may be presented in a form suitable for oral, rectal, parenteral, or intracardial administration, or may be administered by inhalation. Thus, for example, compositions for oral administration may be solid or liquid and may take the form of capsules, tablets, coated tablets, suspensions, etc., such compositions comprising carriers or excipients conveniently used in the pharmaceutical art. Thus suitable tableting excipients include lactose, potato and maize starches, talc, gelatin, and stearic and silicic acids, magnesium stearate and polyvinyl pyrrolidone.

For parenteral administration, the carrier or excipient may be a sterile, parenterally acceptable liquid, e.g., or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient, i.e., compounds within the general Formula I given above. Tablets, coated tablets, capsules, ampules, and suppositories are examples of preferred dosage unit forms according to the invention. Each dosage unit adapted for oral administration may conveniently contain 25 to 900 mg., and preferably 100 to 500 mg., of the active ingredient; each dosage unit adapted for intracardial, intravenous, or inhalation administration may conveniently contain 10 to 280 mg., and preferably 50 to 200 mg., of the active ingredient; whereas each dosage unit adapted for intramuscular administration may conveniently contain 20 to 400 mg., and preferably 100 to 300 mg., of the active ingredient.

Examples of compositions within the preferred ranges given are as follows:

SYRUP

| Ingredients: | | Amt./5 cc. |
|---|---|---|
| (1) Active ingredient | mg | 500 |
| (2) Glycerin | ml | 1.2500 |
| (3) Sorbitol solution 70% | ml | 2.5000 |
| (4) Sodium sacharrin | mg | 1.0000 |
| (5) Sodium sucaryl | mg | 10.0000 |
| (6) Methyl p-amino benzoate | mg | 5.0000 |
| (7) Propyl p-amino benzoate | mg | 0.2500 |
| (8) Curacao flavor | ml | 0.0025 |
| (9) Water q.s. | ml | 5.0000 |

Procedure:
(1) Dissolve 6 and 7 in hot water.
(2) This solution, when cool, is mixed with #3 and the mixture is stirred until uniform.
(3) Dissolve 1, 2, 4, 5 and 8 in this solution and stir until uniform

CAPSULES

Ingredients:                                    Per cap, mg.
(1) Active ingredient _____  250.000
(2) Lactose _____  146.000
(3) Magnesium stearate _____    4.000

Procedure:
(1) Blend 1, 2 and 3.
(2) Mill this blend and blend again.
(3) This milled blend is then filled into #1 hard gelatin capsules.

TABLETS

Ingredients:                                    Mg./Tab.
(1) Active ingredient _____  200.0
(2) Corn starch _____   20.0
(3) Kelacid _____    20.0
(4) Keltose _____    20.0
(5) Magnesium stearate _____    1.3

Procedure:
(1) Blend 1, 2, 3 and 4.
(2) Add sufficient water portionwise to the blend from step #1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

INTRAVENOUS INJECTION

Ingredients:                                    Per ml.
(1) Active ingredient _____mg__   50.0
(2) pH 4.0 buffer solution, q.s. to _____ml__    1.0

Procedure:
(1) Dissolve the active ingredient in the buffer solution.
(2) Aseptically filter the solution from step #1.
(3) The sterile solution is now aseptically filed into sterile ampuls.
(4) The ampuls are sealed under aseptic conditions.

INTRAMUSCULAR INJECTION

Ingredients:                                    Per ml.
(1) 1 - benzyl-3-pyrrolidinol acetate methobromide _____mg__  50.0
(2) Isotonic buffer solution 4.0, q.s. to __ml__   2.0

Procedure:
(1) Dissolve 1-benzyl-3-pyrrolidinol acetate methobromide in the buffer solution.
(2) Aseptically filter the solution from step #1.
(3) The sterile solution is now aseptically filled into sterile ampuls.
(4) The ampuls are sealed under aseptic conditions.

SUPPOSITORIES

Ingredients:                                    Per supp., mg.
(1) 1-benzyl-3-pyrrolidinol acetate methobromide _____  200.0
(2) Polyethylene glycol 1000 _____ 1350.0
(3) Polyethylene glycol 4000 _____  450.0

Procedure:
(1) Melt 2 and 3 together and stir until uniform.
(2) Dissolve #1 in the molten mass from step 1 and stir until uniform.
(3) Pour the molten mass from step 2 into suppository molds and chill.
(4) Remove suppositories from molds and wrap.

INHALATION

Ingredients:                                    Amt./cc.
(1) 1-benzyl-3-pyrrolidinol acetate methobromide _____mg__   100
(2) Alcohol 95% q.s. _____cc__   1.0

Procedure:
(1) Dissolve #1 and #2.
(2) This solution is properly packaged in an aerosol dispenser containing a metered valve and a suitable propellant.

What is claimed and desired to be secured by United States Letters Patent is:

1. A method of treating a living animal body for cardiac arrhythmia which comprises the step of administering thereto a composition comprising an effective amount of an anti-arrhythmia agent having the following structural formula:

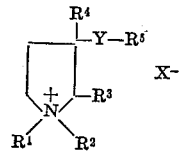

wherein;
$R^1$ is selected from the group consisting of lower-alkyl and hydrogen,
$R^2$ is selected from the group consisting of benzyl and thenyl,
$R^3$ is selected from the group consisting of hydrogen and lower-alkyl,
$R^4$ is selected from the group consisting of hydrogen and lower-alkyl,
$R^5$ is selected from the group consisting of hydrogen, acetyl, propionyl, isobutyroyl, and benzoyl,
Y is selected from the group consisting of oxygen and sulfur, and
$X^-$ is a pharmaceutically acceptable anion.

2. A method as defined in claim 1 wherein said $R^2$ is benzyl.

3. A method as defined in claim 1 wherein the free base of said agent is 1-benzyl-3-pyrrolidinol.

4. A method of treating the heart in an animal body in which cardiac standstill has occurred due to shock or chemical poisoning comprising administering a composition an agent in an amount normally sufficient to restore beating of the heart, said agent having the following structural formula:

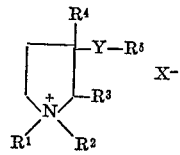

wherein;
$R^1$ is selected from the group consisting of lower-alkyl and hydrogen,
$R^2$ is selected from the group consisting of benzyl and thenyl,
$R^3$ is selected from the group consisting of hydrogen and lower-alkyl,
$R^4$ is selected from the group consisting of hydrogen and lower-alkyl,
$R^5$ is selected from the group consisting of hydrogen, acetyl, propionyl, isobutyroyl and benzoyl, Y is selected from the group consisting of oxygen and sulfur, and X⁻ is a pharmaceutically acceptable anion.

5. A method as defined in claim 4 wherein said $R^2$ is benzyl.

6. A method as defined in claim 4 wherein the free base of said agent is 1-benzyl-3-pyrrolidinol.

7. A composition for controlling arrhythmia with minimal side effects, said composition in unit dosage form comprising an effective amount of about 25 to 900 mg. of an anti-arrhythmia agent having the following structural formula:

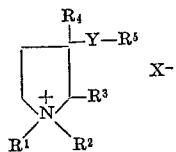

wherein;

$R^1$ is selected from the group consisting of lower-alkyl and hydrogen, $R^2$ is selected from the group consisting of benzyl and thenyl, $R^3$ is selected from the group consisting of hydrogen and lower-alkyl, $R^4$ is selected from the group consisting of hydrogen and lower-alkyl, $R^5$ is selected from the group consisting of hydrogen, acetyl, propionyl, isobutyroyl and benzoyl, Y is selected from the group consisting of oxygen and sulfur, and X⁻ is a pharmaceutically acceptable anion and a pharmaceutically acceptable carrier therefor.

8. A composition as defined in claim 7 wherein said $R^1$ is benzyl.

9. A composition as defined in claim 7 wherein the free base of said antiarrhythmic agent is 1-benzoyl-3-pyrrolidinol.

References Cited

Jones, Journal of Pharmacology and Exp. Therapeutics, vol. 141 (2), pp. 195–203 (1963).

Muscholl et al., British Journal of Pharmacology, vol. 22 (1), pp. 193–203 (1964).

Burger, Medicinal Chem., 2nd ed., p. 497 (1960).

ALBERT T. MEYERS, Primary Examiner.

S. J. FRIEDMAN, Assistant Examiner.

UNITED STATES PATENT OFFICE
CERTIFICATE OF CORRECTION

Patent No. 3,446,897                          May 27, 1969

Theodore F. Koppanyi

It is certified that error appears in the above identified patent and that said Letters Patent are hereby corrected as shown below:

Column 1, line 22, "cadriac" should read -- cardiac --; line 46, "an anion pharmaceutically acceptable" should read -- a pharmaceutically acceptable anion --. Column 2, line 27, "an" should read -- any --. Column 4, line 17, "$R^2$" should read -- $R^1$ --; line 47, "$(R^5)_{20}$" should read -- $(R^5)_2O$ --. Column 5, line 33, "$R^4$" should read -- R- --. Column 7, line 58, "24.7%" should read -- 24.74% --. Column 12, line 8, after "normal" insert -- heart --. Column 14, line 54, after "tion" insert -- comprising --. Column 16, line 14, "benzoyl" should read -- benzyl --.

Signed and sealed this 17th day of March 1970.

(SEAL)

Attest:

Edward M. Fletcher, Jr.

Attesting Officer

WILLIAM E. SCHUYLER, JR.

Commissioner of Patents